INVENTOR
JEAN ALBERT GREGOIRE
ATTORNEYS

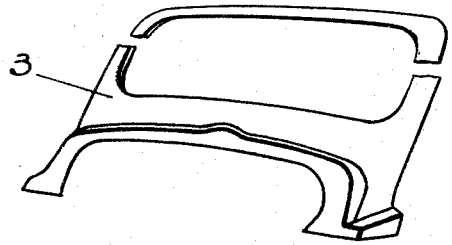
Fig. 1
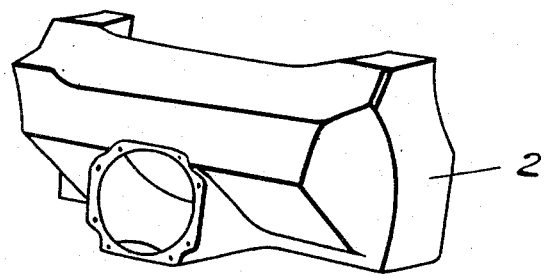
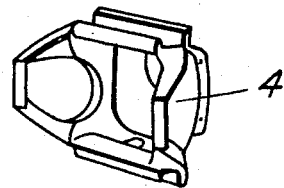
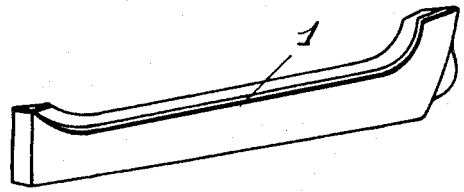
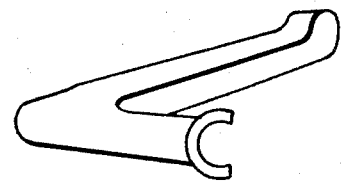
INVENTOR
JEAN ALBERT GREGOIRE
ATTORNEYS

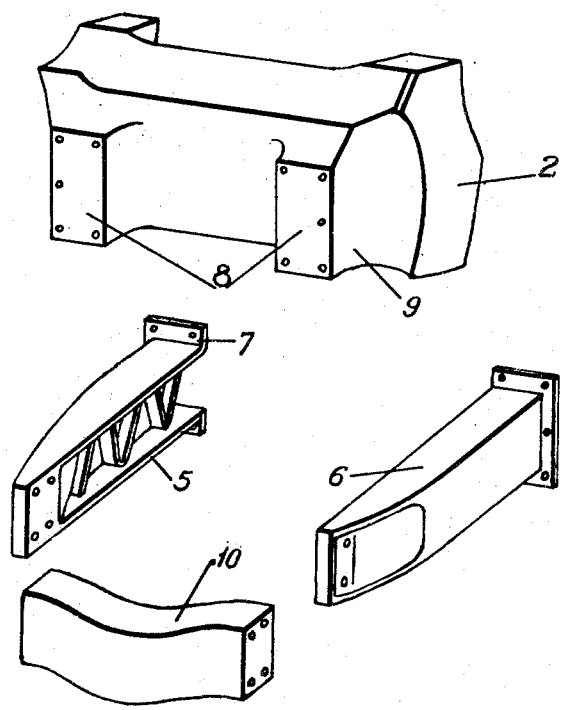

Patented Apr. 17, 1951

2,549,191

UNITED STATES PATENT OFFICE 2,549,191

MOTOR VEHICLE AND ITS MANUFACTURE

Jean Albert Grégoire, Paris France

Application November 1, 1945, Serial No. 626,102
In France May 24, 1944

Section 1, Public Law 690, August 8, 1946
Patent expires March 24, 1964

4 Claims. (Cl. 296—28)

My invention has for its object improvements in the method of producing motorcars as described in my prior United States Patent No. 2,192,075. In said prior specification I have disclosed a method for manufacturing a motorcar according to which the chassis and the bodywork were replaced by a number of cast members of special light metal, said members being chiefly constituted by the left hand and right hand longérons or side panels and by a cross member or dashboard unit connecting said side panels, the different members being assembled together and connected eventually by one or more cross members which may be cast or not.

The arrangement thus constituted forms a carcass showing a great rigidity and carrying on one hand all the mechanical parts such as the motor, the transmission, the axles and on the other hand the bodywork elements such as the rear portion, the roof, wings, hood and the like.

Now experience has shown that it is sometimes difficult to cast parts as considerable as one piece side panels or dashboards.

Under such conditions my invention consists in subdividing again these parts (side panels and dashboard) into a certain number of smaller elements which are consequently easier to cast and which are assembled together in the same manner as the side panels and dashboard were assembled in my prior vehicle. On the other hand it has been recognized that it is not essential to extend the side panels up to the front and, in conformity with my invention, the motor instead of being carried directly by the front end of the side panels is carried by one or more cast members secured in their turn to one of the elements forming the dashboard.

Other objects and characteristic features of my invention will appear in the reading of the following description of forms of execution of my invention illustrated diagrammatically by way of examples and by no means in a limitative sense, as applied to a motor car the front wheels of which are both driving and steering wheels.

Fig. 1 shows the different constructional elements separate.

Fig. 3 shows a modification of the element forming the support of the motor.

Figure 2:
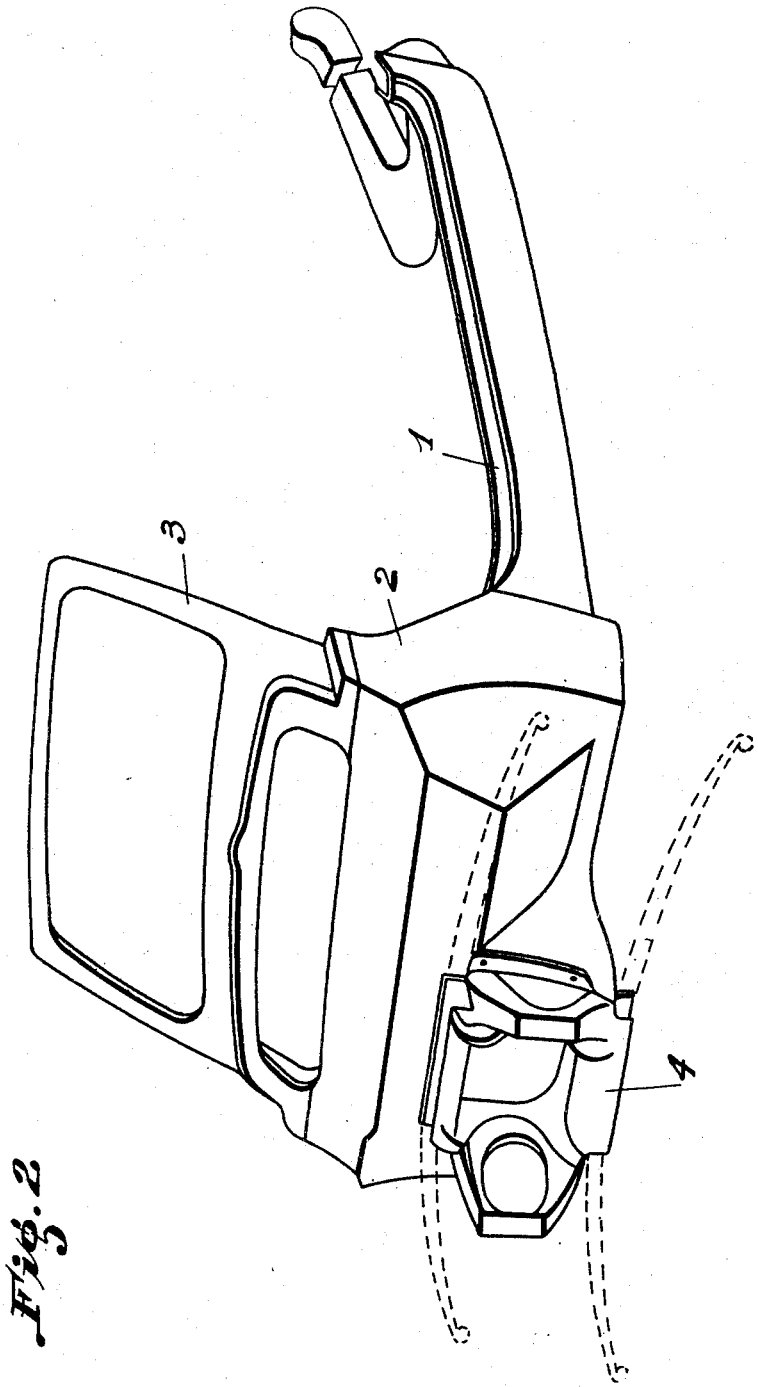
Fig. 2 shows these same elements assembled for forming a motor car.

In Figs. 1 and 2, 1 designates the elements forming the rear end of the side panels. These elements instead of extending up to the front of the motor car as in my prior specification stop to the rear of the dashboard.

The dashboard itself is constituted by two elements, a lower element 2 to which are secured as disclosed hereinabove the rear elements of the side panels 1 and an upper element 3 secured to the upper part of the element 2.

On the other hand, according to my invention, the lower element 2 forming the dashboard may be considered as the center and the chief member of the carcass; it carries a cast member 4 the shape of which is illustrated in the drawings, said cast member 4 carrying the whole of the mechanical part of the motor car. This cast member replaces consequently the front part of the side panels of my prior construction.

In particular, as apparent from the drawing, the suspension springs shown in broken lines are mounted on said member 4 together with the motor which is not shown; the member considered forms thus a cradle for said motor and the like elements.

In Fig. 3 which is a perspective view of the different elements forming the front part of the carcass, the single carrier member 4 is replaced by two arms 5 and 6 adapted to be secured through bolting or otherwise to flat surfaces 8 provided for this purpose to the front of the dashboard 9 for cooperation with the rear surfaces 7 of the arms 5 and 6. Preferably this arrangement comprises a complementary cross-member 10 to the front, said cross-member being also adapted to be bolted or otherwise secured between the front ends of the arms 5 and 6.

The arrangement thus constituted by the arms 5 and 6 and the front cross-member 10 forms a cradle adapted to carry the motor and to receive the attachments of the suspension springs, not shown in Fig. 3.

Obviously numerous modifications may be brought to the arrangements described without widening the scope of my invention as defined in appended claims. In particular the dashboard element 2 may also be constituted by a plurality of elements and similar modifications may be brought to the forms of execution disclosed.

What I claim is:

1. An automobile chassis comprising, in combination: a rigid transverse member forming a portion of a dash and the main transverse member of the chassis; side sills secured at their forward ends to the respective ends of said transverse member and terminating forwardly at said member; a unitary cradle member comprising a base secured by a bolted connection to the central portion of said main member, upper and lower seats for transverse springs formed on said base, and spaced motor and transmission supporting portions extending forwardly from said base to free ends adapted to lie on opposite sides of the power assembly of an automobile.

2. The structure of claim 1 with a dash completing and wind-shield carrying member bolted to the upper portion of said main member.

3. The structure of claim 2 with said members each consisting of a unitary light metal casting.

4. In an automobile chassis, in combination: an intermediate member forming a portion of a dashboard and the main cross-connection of the chassis, the ends of said member forming a portion of the outside of the body of a vehicle; side sill members forming also portions of the outside of the body of the vehicle; said sills terminating forwardly at said intermediate member and the ends thereof rigidly fixed to the respective ends of the first named member; a relatively short and narrow bracket member of substantially less width than the length of said first named member secured thereto and constituting a cradle for the motor; said bracket-cradle formed with upper and lower transverse spring seats closely adjacent said first named member to receive the front suspension springs, with a base rigidly bolted to the central portion of the first named member and with forwardly projecting portions to receive and support a motor therebetween.

JEAN ALBERT GRÉGOIRE.

REFERENCES CITED

The following references are of record in the file of this patent:

UNITED STATES PATENTS

| Number | Name | Date |
|---|---|---|
| 985,361 | McCauley | Feb. 28, 1911 |
| 1,261,603 | Palmer | Apr. 2, 1918 |
| 1,353,427 | Seguin | Sept. 21, 1920 |
| 1,808,561 | Ledwinka | June 2, 1931 |
| 1,822,775 | Henninger | Sept. 8, 1931 |
| 1,948,744 | Curtiss | Feb. 27, 1934 |
| 1,972,438 | Bugatti | Sept. 4, 1934 |
| 2,066,352 | Kliesrath | Jan. 5, 1937 |
| 2,075,041 | Kliesrath | Mar. 30, 1937 |
| 2,160,271 | Kliesrath | May 30, 1939 |
| 2,192,075 | Gregoire | Feb. 27, 1940 |

FOREIGN PATENTS

| Number | Country | Date |
|---|---|---|
| 542,854 | France | 1922 |
| 572,257 | France | Feb. 18, 1924 |
| 304,130 | Great Britain | 1929 |